United States Patent
Bernard

(10) Patent No.: US 12,054,096 B2
(45) Date of Patent: Aug. 6, 2024

(54) METHOD FOR SIMULATING A NOISE IN A MOTOR VEHICLE

(71) Applicant: Dr. Ing. h.c. F. Porsche Aktiengesellschaft, Stuttgart (DE)

(72) Inventor: Benjamin Bernard, Karlsruhe (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 584 days.

(21) Appl. No.: 17/182,500

(22) Filed: Feb. 23, 2021

(65) Prior Publication Data

US 2021/0331621 A1   Oct. 28, 2021

(30) Foreign Application Priority Data

Apr. 22, 2020 (DE) .................. 10 2020 110 974.1

(51) Int. Cl.
  *B60Q 1/00* (2006.01)
  *B60Q 9/00* (2006.01)
  *H04R 3/12* (2006.01)

(52) U.S. Cl.
  CPC .............. *B60Q 9/008* (2013.01); *H04R 3/12* (2013.01); *H04R 2499/13* (2013.01); *H04S 2400/11* (2013.01); *H04S 2400/13* (2013.01)

(58) Field of Classification Search
  CPC ...... B60Q 9/008; H04R 3/12; H04R 2499/13; H04S 2400/11; H04S 2400/13
  USPC ........................................................ 340/435
  See application file for complete search history.

(56) References Cited

U.S. PATENT DOCUMENTS

| 10,414,411 | B2 | 9/2019 | Kuroda et al. |
| 2014/0023211 | A1* | 1/2014 | Inou .................. B60Q 9/00 381/302 |
| 2016/0016513 | A1 | 1/2016 | Di Censo et al. |
| 2017/0154533 | A1* | 6/2017 | Illy ........................ G08G 1/166 |
| 2018/0053413 | A1* | 2/2018 | Patil ..................... G08G 1/0965 |
| 2020/0189614 | A1* | 6/2020 | Ito ..................... B60W 30/0956 |

FOREIGN PATENT DOCUMENTS

| DE | 10 2017 203 515 A1 | 9/2018 |
| JP | 2003035550 A | 2/2003 |
| WO | 2017168602 A1 | 10/2017 |

OTHER PUBLICATIONS

Japanese Notice of Reasons for Refusal for Japanese Application No. 2021-070271, dated May 11, 2022, 2 pages.

* cited by examiner

*Primary Examiner* — Naomi J Small
(74) *Attorney, Agent, or Firm* — Buchanan Ingersoll & Rooney PC

(57) ABSTRACT

A method for simulating a noise in a motor vehicle includes the steps of defining a virtual noise source in a position outside the motor vehicle; simulating a noise from the virtual noise source, wherein the simulation takes place using real noise sources inside the motor vehicle; and changing the position of the virtual noise source relative to the motor vehicle depending on a speed of the motor vehicle.

5 Claims, 3 Drawing Sheets

METHOD FOR SIMULATING A NOISE IN A MOTOR VEHICLE

CROSS-REFERENCE TO RELATED APPLICATION

This application claims priority to German Patent Application No. 10 2020 110 974.1, filed Apr. 22, 2020, the content of such application being incorporated by reference herein in its entirety.

FIELD OF THE INVENTION

The present invention relates to a method for simulating a noise in a motor vehicle.

BACKGROUND OF THE INVENTION

The definition of a virtual noise source in a motor vehicle is known. In this case, a noise originating from the virtual noise source is simulated using real noise sources. It sounds to the user as though the noise was generated by the virtual noise source. US 2016/0016513 A1, which is incorporated herein by reference in its entirety and for all purposes, also discloses adjusting the position of the virtual noise source depending on acceleration and braking operations and cornering.

SUMMARY OF THE INVENTION

In contrast to the art described above, the present invention relates to improving the driving experience for a driver of a motor vehicle with an electric drive.

A virtual noise source is defined in a position outside the motor vehicle. In particular, it is possible for the virtual noise source to be defined laterally offset in relation to the motor vehicle. Within the scope of this description, this is understood to mean, in particular, that the virtual noise source is defined offset in a lateral direction in relation to the motor vehicle. Within the scope of this description, the lateral direction is understood to mean, in particular, a direction which runs in a horizontal direction perpendicularly to a movement direction of the motor vehicle without the wheels being steered. In addition to the lateral offset, the virtual noise source can also be arranged behind or in front of the motor vehicle. In this case, the virtual noise source can float freely in space for example.

A noise from the virtual noise source is simulated. The simulation takes place using real noise sources inside the motor vehicle. The real noise sources can be present, in particular, as physical components. The real noise sources can be, for example, loudspeakers which are also used for generating other noises in the motor vehicle. For example, music can be played by means of the real noise sources.

The position of the virtual noise source is changed relative to the motor vehicle depending on a speed of the motor vehicle. For example, the position of the virtual noise source relative to the motor vehicle can be shifted counter to a direction of travel of the motor vehicle in which the motor vehicle is moving. In this case, the faster the motor vehicle is moving, the faster said position can be shifted.

Owing to the virtual noise source, the driver is provided with a better sense of the speed achieved by the motor vehicle. This is advantageous particularly in the case of motor vehicles with an electric drive since the noise of the internal combustion engine which many drivers are used to is missing here. The faster the motor vehicle is, the faster the virtual noise source moves away from the driver to the rear.

According to one embodiment of the invention, the position of the virtual noise source relative to an area surrounding the motor vehicle can be fixed. In this case, a particularly realistic experience is created for the driver. It sounds as though he is driving past a real stationary noise source. Based on his experience, he can realistically estimate the speed in this way.

According to one embodiment of the invention, a plurality of virtual noise sources can be defined. The virtual noise sources can be at the same distance from one another in a direction in which the motor vehicle is moving. For example, the virtual noise sources can be defined at these distances along a geometric straight line. In this case, the geometric straight line can be arranged parallel to the direction of travel of the motor vehicle. It is important here that the geometric straight line is not present as a component but merely as a virtual straight line and serves to define the positions of the virtual noise sources.

The driving experience for the driver is further improved by the plurality of virtual noise sources at the same distances from one another. If said driver changes his speed, the frequency at which he passes the virtual noise sources also changes. Therefore, acceleration and braking operations are presented in an acoustically realistic manner.

According to one embodiment of the invention, the distance of the virtual noise sources from one another can be dependent on the speed of the motor vehicle and/or on a torque demand. In this embodiment, it is important that the distance of the virtual noise sources from one another does not necessarily have to be the same. Within the scope of this description, a torque demand is understood to mean, in particular, an action by a user which triggers the drive of the motor vehicle to generate a certain torque. For example, this may be the operation of a pedal in order to increase the speed of the motor vehicle.

Owing to the dependence of the distance on the speed and/or on the torque demand, the driving experience can be made even more interesting for the driver since the speed and/or the torque demand is acoustically more strongly emphasized than when the virtual noise sources are at a constant distance from one another.

According to one embodiment of the invention, the virtual noise sources can be laterally offset in relation to the motor vehicle.

The motor vehicle comprises a plurality of real noise sources and a control unit. The control unit is designed to trigger the real noise sources to emit noises. The control unit is also designed to execute a method according to one embodiment of the invention.

BRIEF DESCRIPTION OF THE DRAWING FIGURES

Further features and advantages of the present invention will become clear on the basis of the following description of a preferred exemplary embodiment with reference to the appended drawings. Here, the same reference signs are used for identical or similar components and for components having identical or similar functions. In said drawings, FIG. 1 shows a schematic plan view of a motor vehicle according to one embodiment of the invention and a virtual noise source;

DETAILED DESCRIPTION OF THE INVENTION

A motor vehicle 100 has a control unit 110 and real noise sources 115 in the form of audio speakers (for example). Noise sources 115 are arranged in the motor vehicle are used in order to simulate virtual noise sources 101 and 101' as the vehicle drives along a road. Here, the virtual noise sources 101 and 101' are arranged laterally offset in relation to the motor vehicle. The virtual noise sources 101 and 101' are stationary in relation to a surrounding area in FIGS. 1 to 5. Therefore, the motor vehicle 100 is moving relative to the virtual noise sources 101 and 101'.

Figure 1:
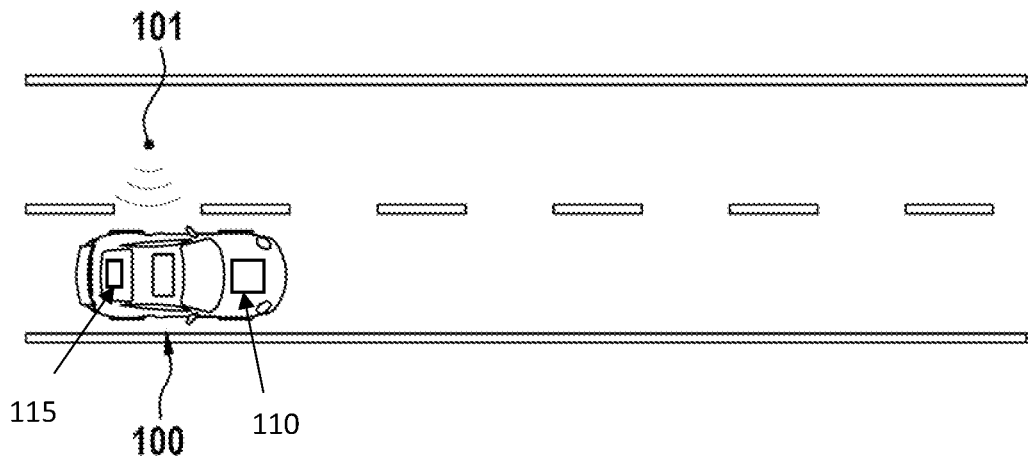
Figure 2:
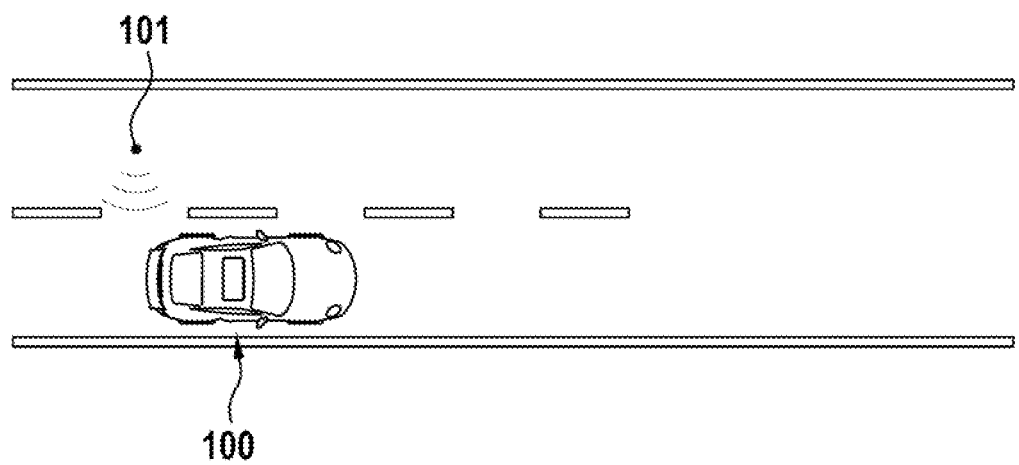
FIG. 2 shows a schematic plan view of the motor vehicle and the virtual noise source from FIG. 1 at a later time than in FIG. 1.

At a first time, which is illustrated in FIG. 1, the virtual noise source 101 is arranged laterally next to the motor vehicle 100. At a later time, which is illustrated in FIG. 2, the virtual noise source 101 is arranged laterally offset behind the motor vehicle 100. This provides the driver with an acoustic sense of driving past a noise source arranged outside the motor vehicle 100 in a stationary manner in relation to the surrounding area. The noise perceived by the driver differs depending on the speed of the motor vehicle 100. Therefore, the sense of the driver in respect of the speed achieved by the motor vehicle 100 is acoustically assisted.

Figure 3:
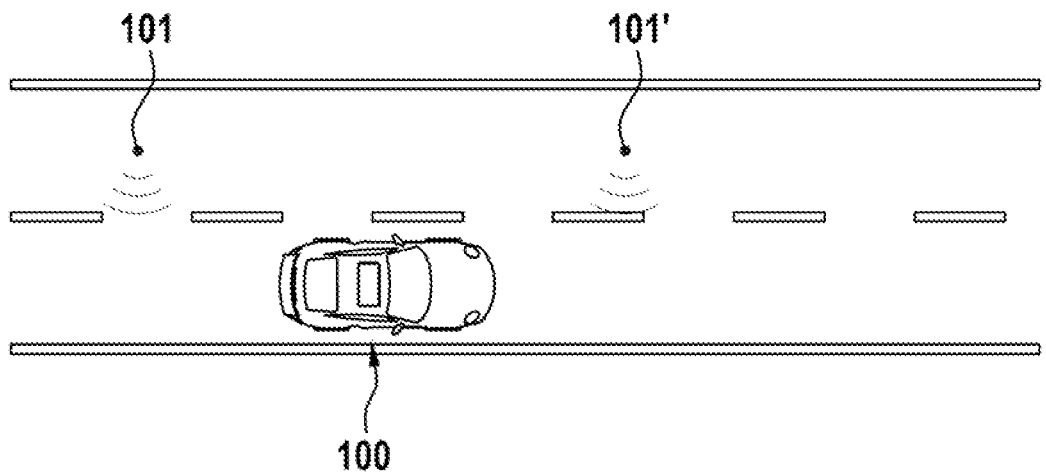
FIG. 3 shows a schematic plan view of the motor vehicle and the virtual noise source from FIG. 1 and a further virtual noise source at a later time than in FIG. 2.

FIG. 3 illustrates how the motor vehicle 100 is situated between the virtual noise source 101 and a further virtual noise source 101' at a later time than in FIG. 2. Therefore, the virtual noise source 101 moves away to the rear of the driver, while the virtual noise source 101' approaches from the front. This process also assists the driver acoustically in perceiving the speed of the motor vehicle 100.

Figure 4:
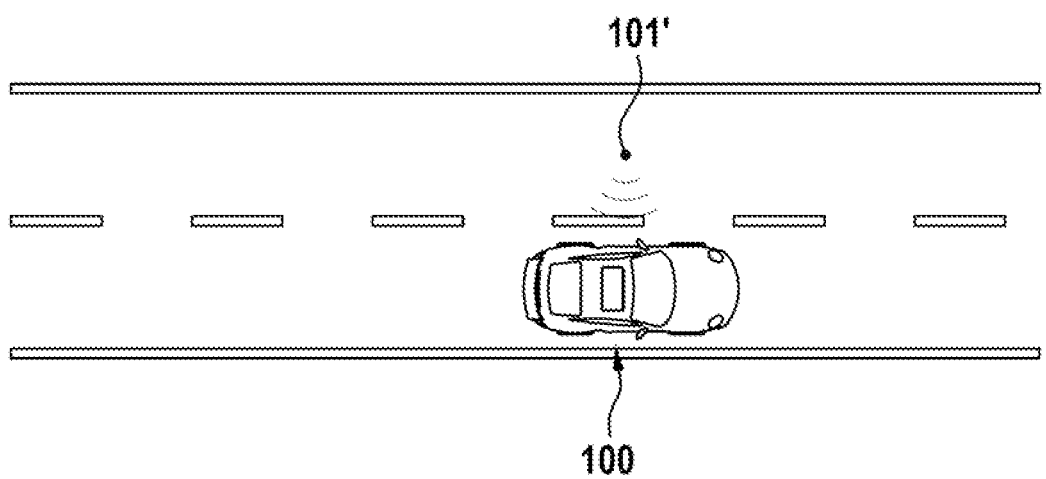
FIG. 4 shows a schematic plan view of the motor vehicle and the further virtual noise source from FIG. 3 at a later time than in FIG. 3.
Figure 5:
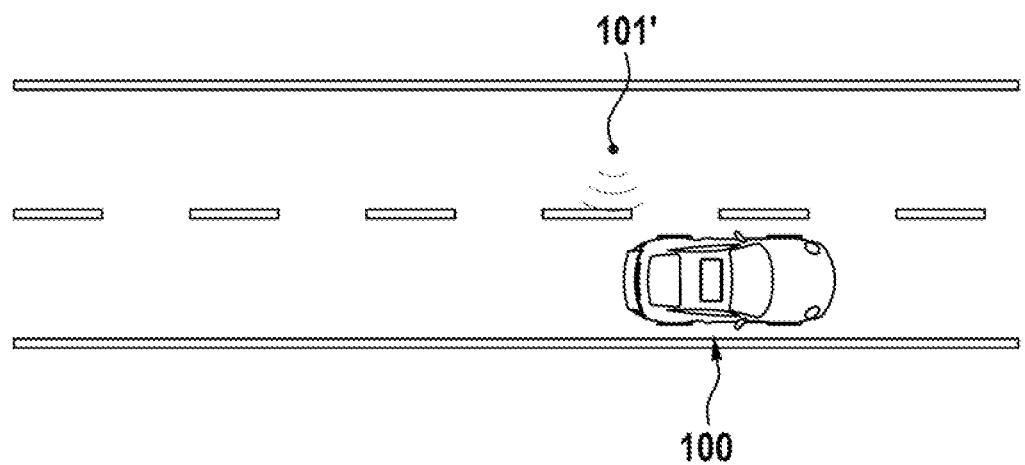
FIG. 5 shows a schematic plan view of the motor vehicle and the further virtual noise source from FIG. 3 at a later time than in FIG. 4.

FIG. 4 illustrates how the motor vehicle 100 is situated laterally next to the further virtual noise source 101' at a later time than in FIG. 3. Here, the situation is similar to FIG. 1 in the case of the virtual noise source 100. In FIG. 5, the further virtual noise source 101' is situated laterally offset behind the motor vehicle, similarly to the virtual noise source 101 in FIG. 2.

By way of driving past the virtual noise sources 101 and 101', the driver of the motor vehicle 100 is given the acoustic impression that he is moving past a plurality of noise sources arranged in a stationary manner in the surrounding area. The frequency at which the motor vehicle passes the virtual noise sources 101 and 101' changes depending on the speed. Therefore, the driver is acoustically given a sense of the speed of the motor vehicle 100.

Figure 6:
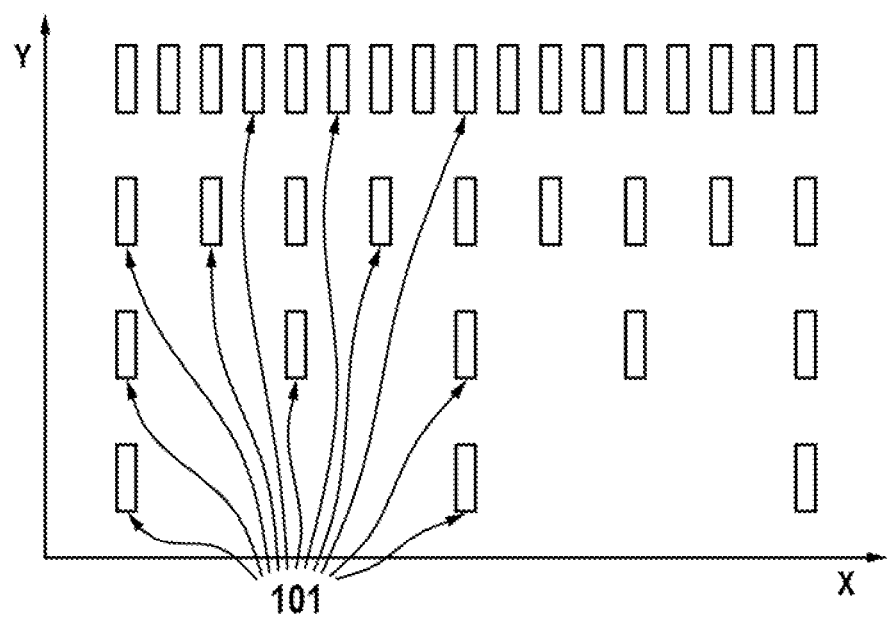
FIG. 6 shows a schematic diagram which the distance between virtual noise sources depending on a speed of the motor vehicle and/or on a torque demand.

In the diagram in FIG. 6, a location is plotted on the X axis. The speed of the motor vehicle 100, a torque demand or a combination of the speed and the torque demand can be plotted on the Y-axis depending on the embodiment of the invention. For the sake of simplicity, the information plotted on the Y-axis is referred to below as "parameter" for all of the embodiments collectively. The value of the parameter increases from the bottom to the top on the Y-axis. This means that, for example, a higher speed, a higher torque demand or a higher value for a combination of the speed and the torque demand is plotted further at the top than further at the bottom.

Here, the distances of the virtual noise sources 101 from one another are relatively large in the case of relatively small parameters. For reasons of clarity, not all of the virtual noise sources 101 are provided with a reference sign here. However, nevertheless, each rectangle in FIG. 6 represents a virtual noise source. The distances become smaller as the parameters become greater. Therefore, if, for example, the motor vehicle 100 is accelerated and/or a higher torque is demanded, the distance of the virtual noise sources 101 from one another is reduced. If the demanded torque and/or the speed of the motor vehicle 100 drops, the distance between the virtual noise sources 101 is increased.

In this way, the sense of the speed and/or the torque demand given acoustically to the driver can be yet further increased since changes in the speed and/or the torque demand are emphasized. If the motor vehicle 100 becomes faster for example, the frequency at which it passes the virtual noise sources 101 would increase, even though the distance between the virtual noise sources 101 remains the same. This effect is further amplified by the reduction in distance in the case of an increase in the speed and/or in the case of an increase in the torque demand.

What is claimed is:

1. A method for simulating a noise in a motor vehicle, wherein the method comprises the following steps:
    defining a plurality of virtual noise sources in respective positions outside the motor vehicle, wherein the virtual noise sources are at a same distance from one another in a direction in which the motor vehicle is moving;
    simulating a noise from each of the virtual noise sources, wherein the simulation takes place using real noise sources inside of the motor vehicle; and
    changing the positions of the virtual noise sources relative to the motor vehicle depending on a speed of the motor vehicle.

2. The method as claimed in claim 1, wherein the positions of the virtual noise sources relative to the area surrounding the motor vehicle are fixed.

3. The method as claimed in claim 1, wherein the distance of the virtual noise sources from one another is dependent on the speed of the motor vehicle and/or on a torque demand from a drive of the motor vehicle.

4. The method as claimed in claim 1, wherein the virtual noise sources are arranged laterally offset in relation to the motor vehicle.

5. A motor vehicle comprising a plurality of real noise sources and a control unit, wherein the control unit is configured to: (i) define a plurality of virtual noise sources in respective positions outside the motor vehicle, wherein the virtual noise sources are at a same distance from one another in a direction in which the motor vehicle is moving, (ii) simulate a noise from each of the virtual noise sources by triggering the real noise sources inside of the motor vehicle; and (iii) change the positions of the virtual noise sources relative to the motor vehicle depending on a speed of the motor vehicle.

* * * * *